(12) United States Patent
Ohmura

(10) Patent No.: US 9,701,267 B1
(45) Date of Patent: Jul. 11, 2017

(54) VEHICLE BODY TRANSFORMABLE FRONT SECTION STRUCTURE

(71) Applicant: TOYOTA JIDOSHA KABUSHIKI KAISHA, Toyota-shi, Aichi-ken (JP)

(72) Inventor: Yukito Ohmura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/350,812

(22) Filed: Nov. 14, 2016

(30) Foreign Application Priority Data

Jan. 12, 2016 (JP) .................................. 2016-003903

(51) Int. Cl.
  *B60R 19/34* (2006.01)
  *B60R 19/20* (2006.01)
  *B60R 19/48* (2006.01)

(52) U.S. Cl.
  CPC ............ *B60R 19/205* (2013.01); *B60R 19/34* (2013.01); *B60R 19/483* (2013.01)

(58) Field of Classification Search
  CPC ...... B60R 19/205; B60R 19/34; B60R 19/483
  USPC ......................... 293/107, 110, 117, 133, 134; 296/187.06; 180/274; 701/45
  See application file for complete search history.

(56) References Cited

U.S. PATENT DOCUMENTS

| 5,106,137 A * | 4/1992 | Curtis ..................... B60R 19/20 |
| | | 293/107 |
| 6,334,639 B1 * | 1/2002 | Vives ...................... B60R 19/18 |
| | | 293/107 |
| 2002/0177934 A1 | 11/2002 | Yokota et al. |
| 2002/0188393 A1 | 12/2002 | Yokota et al. |

FOREIGN PATENT DOCUMENTS

| JP | 2001-058552 A | 3/2001 |
| JP | 2003-511309 A | 3/2003 |
| JP | 2009-067066 A | 4/2009 |
| WO | 01/26952 A1 | 4/2001 |

* cited by examiner

*Primary Examiner* — Stephen Gordon
(74) *Attorney, Agent, or Firm* — Oliff PLC

(57) ABSTRACT

A vehicle body transformable front section structure including: a front side member; a crash box that is configured including a tube shaped section having mountain portions and valley portions provided alternately along the vehicle front-rear direction and capable of extending in the vehicle front-rear direction, and that is attached to an end portion at a vehicle front side of the front side member; bumper reinforcement; a collision prediction section; and a gas generator; the tube shaped section being configured including a first wall portion and a second wall portion respectively disposed connected to each other in the vehicle front-rear direction through each of the mountain portions; and a recess being formed on an inner face side of the tube shaped portion in at least one out of the first wall portion or the second wall portion so as to enlarge the surface area of the inner face.

7 Claims, 8 Drawing Sheets

VEHICLE BODY TRANSFORMABLE FRONT SECTION STRUCTURE

CROSS-REFERENCE TO RELATED APPLICATION

This application is based on and claims priority under 35 USC 119 from Japanese Patent Application No. 2016-003903 filed on Jan. 12, 2016, the disclosure of which is incorporated by reference herein.

BACKGROUND

Technical Field

The present disclosure relates to a vehicle body transformable front section structure.

Related Art

Japanese Patent Application Laid-Open (JP-A) No. 2009-067066 describes an disclosure relating to a shock absorbing device. The shock absorbing device is provided with a gas generator that is housed in an internal space of a crash box, and configuration is made in which the gas generator is actuated when an acceleration sensor installed to the vehicle has detected an acceleration of a threshold value or greater. Thus, when collision load from a vehicle front side is input, in cases in which the acceleration sensor has detected acceleration of the threshold value or greater, high pressure gas generated by the gas generator is supplied to the internal space of the crash box, thereby raising the strength of the crash box. However, in cases in which the acceleration sensor has detected an acceleration smaller than the threshold value, the gas generator is not actuated, and there is no change in the strength of the crash box.

Accordingly, the related art described in JP-A No. 2009-067066 is capable of accommodating a wide range of collision conditions by varying the strength of the crash box according to the magnitude of the collision during an actual collision.

However, in the case of the related art described in JP-A No. 2009-067066, since the high pressure gas is supplied into the internal space of the crash box following input of the collision load to the vehicle, it is conceivable that deformation could occur before the strength of the crash box has been completely raised by the high pressure gas. Moreover, even if the acceleration detected by the acceleration sensor is a value close to the threshold value, so long as the detected acceleration is smaller than the threshold value, the gas generator will not actuate, and so it is conceivable that the amount of deformation in the crash box could be insufficient to absorb the collision load. Namely, in the related art described in JP-A No. 2009-067066, there is room for improvement regarding the point of improving absorption performance of collision load from the vehicle front side.

In consideration of the above, a configuration is conceivable in which mountain portions and valley portions are provided alternately to the crash box along a vehicle front-rear direction such that the crash box is configured capable of extending along the vehicle front-rear direction, and thus, when a vehicle frontal collision is predicted, the crash box is extended using the gas generator. In such a configuration, a crushing stroke over which collision load can be absorbed from the vehicle front side is lengthened, and collision load from the vehicle front side can be absorbed accommodating collision loads of different magnitudes according to the size of the crush amount of the crash box.

However, it is conceivable that if collision load from the vehicle front side were to be input in a state in which the crash box has not extended to a sufficiently complete state, namely, a state in which crease lines remained, the crash box could fold and deform along the alternately provided mountain portions and valley portions, and sufficient energy absorption performance could become unobtainable. Namely, even when a crash box is configured capable of extending in the vehicle front-rear direction, an issue remains regarding the point of suppressing crease lines from remaining, and stably absorbing collision load, in a state in which the crash box has extended.

SUMMARY

In consideration of the above circumstances, an object of the present disclosure is to obtain a vehicle body transformable front section structure that can stably absorb collision load from the vehicle front side even when a crash box is configured capable of extending in the vehicle front-rear direction.

A vehicle body transformable front section structure according to a first aspect of the present disclosure includes a front side member that is disposed with a length direction in a vehicle front-rear direction, a crash box that is disposed with a length direction in the vehicle front-rear direction, that is configured including a tube shaped section having mountain portions and valley portions provided alternately along the vehicle front-rear direction and capable of extending in the vehicle front-rear direction, and that is attached to an end portion at a vehicle front side of the front side member, bumper reinforcement that extends in a vehicle width direction, that is disposed at a vehicle front side of the crash box, and that is attached to the crash box, a collision prediction section that is capable of predicting a vehicle frontal collision, and a gas generator that is disposed inside the tube shaped section or the front side member, and that generates gas and supplies gas to inside the tube shaped section on actuation when the frontal collision has been predicted by the collision prediction section. The tube shaped section is configured including a first wall portion and a second wall portion respectively disposed so as to be connected to each other in the vehicle front-rear direction through each of the mountain portions. A recess is formed on an inner face side of the tube shaped portion in at least one out of the first wall portion or the second wall portion so as to enlarge the surface area of the inner face.

According to the first aspect of the present disclosure, the gas generator disposed inside the tube shaped section configuring the crash box or the front side member actuates when a vehicle frontal collision has been predicted by the collision prediction section, thereby supplying gas to inside the tube shaped section. Moreover, the tube shaped section of the crash box is disposed with its length direction in the vehicle front-rear direction, is alternately provided with the mountain portions and the valley portions along the vehicle front-rear direction, and is configured capable of extending in the vehicle front-rear direction. The inside of the tube shaped section is supplied with gas and thereby extends in the vehicle front-rear direction prior to a collision of the vehicle with a colliding body, and thereby enables a crushing stroke capable of absorbing collision load from the vehicle front side to be lengthened compared to a state before the gas was supplied. As a result, when the collision load from the vehicle front side is large, the crush amount of the tube shaped section of the crash box is large, and when the collision load is small, the crush amount is small. Namely, in the present disclosure, collision load from the vehicle front side can be absorbed accommodating collision loads of different magnitudes, according to the size of the crush amount of the tube shaped section of the crash box.

By the way, if collision load from the vehicle front side were to be input in a state in which the tube shaped section of the crash box has not been extended to a sufficiently complete state by the gas from the gas generator, it is conceivable that the tube shaped section could fold and deform along the mountain portions and the valley portions provided alternately thereto.

Note that in the present disclosure, the tube shaped section of the crash box is configured including the first wall portion and the second wall portion respectively disposed so as to be connected to each other in the vehicle front-rear direction through each of the mountain portions. The recess is formed on the inner face side of the tube shaped portion in at least one out of the first wall portion or the second wall portion so as to enlarge the surface area of the inner face. Thus, the first wall portion and/or the second wall portion provided with the recess portion has an increased surface area that bears pressure from the gas generated by the gas generator compared to cases in which the recess is not provided, and a moment to spread the first wall portion and the second wall portion apart about the mountain portion is generated. As a result, crease lines can be suppressed from remaining in a state in which the tube shaped section of the crash box has extended, enabling the tube shaped section to stably absorb collision load along the length direction of the tube shaped section.

A vehicle body transformable front section structure according to a second aspect of the present disclosure is the first aspect, wherein the recess is disposed at a position where a distance between the recess and the respective mountain portion is the distance between the recess and the respective valley portion, or greater.

According to the second aspect of the present disclosure, the moment arm of the moment acting due to pressure from the gas generated by the gas generator to spread apart the first wall portion and the second wall portion can be lengthened.

A vehicle body transformable front section structure according to a third aspect of the present disclosure is the second aspect, wherein the recess is configured including a parallel plane portion that is formed parallel to a straight line joining an apex of the respective mountain portion and an apex of the respective valley portion together as viewed in cross-section from a direction orthogonal to an extension direction of the mountain portion and the valley portion.

According to the third aspect of the present disclosure, out of the pressure due to the gas generated by the gas generator, a proportion of the pressure acting orthogonal to the straight line joining the apex of the respective mountain portion and the apex of the respective valley portion can be increased. As a result, the proportion of gas pressure acting in a direction orthogonal to the moment arm of the moment to spread apart the first wall portion and the second wall portion about the mountain portion can be increased.

A vehicle body transformable front section structure according to a fourth aspect of the present disclosure is any one of the first aspect to the third aspect, wherein the recesses configure part of bead portions that form protrusions projecting toward the outside of the tube shaped section on the first wall portion and the second wall portion respectively.

According to the fourth aspect of the present disclosure, the recesses can be formed in the first wall portion and the second wall portion while securing the plate thickness of the first wall portion and the second wall portion.

As explained above, the vehicle body transformable front section structure according to the first aspect of the present disclosure has the excellent advantageous effect of enabling collision load from the vehicle front side to be stably absorbed, even when a crash box is configured capable of extending along a vehicle front-rear direction.

The vehicle body transformable front section structure according to the second aspect of the present disclosure has the excellent advantageous effect of enabling pressure due to gas generated by the gas generator to be efficiently employed in extending the crash box.

The vehicle body transformable front section structure according to the third aspect of the present disclosure has the excellent advantageous effect of enabling the force generated by gas generated by the gas generator for extending the crash box to be increased.

The vehicle body transformable front section structure according to the fourth aspect of the present disclosure has the excellent advantageous effect of enabling stress to be suppressed from concentrating locally during crushing of the crash box.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a first exemplary embodiment of a vehicle body transformable front section structure according to the present disclosure, with reference to FIG. 1 to FIG. 5. Note that in each of the drawings, the arrow FR indicates the vehicle front side and the arrow OUT indicates the vehicle width direction outer side, as appropriate.

Figure 3:
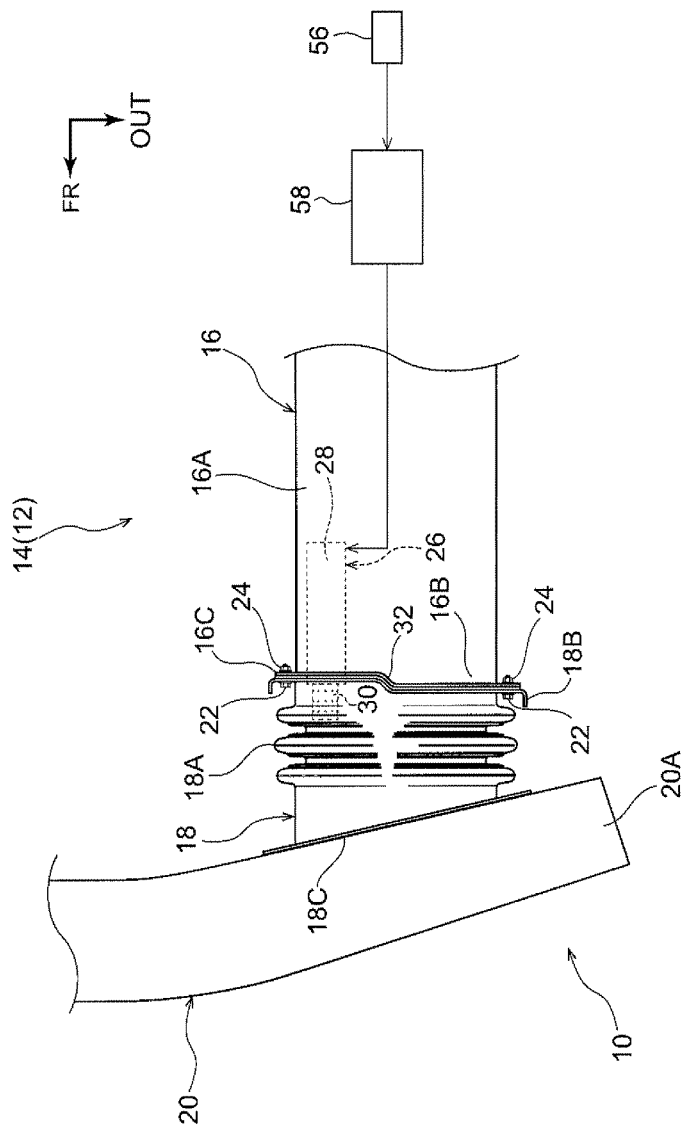
FIG. 3 is a plan view illustrating configuration of a vehicle body transformable front section structure according to the first exemplary embodiment, as viewed from above the vehicle.

First, explanation follows regarding a schematic configuration of a vehicle body front section 14 configuring a section at a vehicle front side of a vehicle body 12 of a vehicle 10 that is applied with the vehicle body transformable front section structure according to the present exemplary embodiment, with reference to FIG. 3. Note that in the present exemplary embodiment, the vehicle body 12 is basically configured with left-right symmetry, and so explanation focuses on configuration of a vehicle width direction left portion of the vehicle body 12.

The vehicle body front section 14 is configured including a left and right pair of front side members 16, crash boxes 18 that are attached to the front side members 16, and bumper reinforcement 20 spanning between the crash boxes 18.

Each front side member 16 configures framework of the vehicle body 12, extends in a vehicle front-rear direction overall, and has a closed cross-section structure that forms a closed cross-section having a rectangular frame shape as viewed along the vehicle front-rear direction. The front side member 16 is configured including a front portion 16A that configures a vehicle front portion thereof, and that extends linearly along the vehicle front-rear direction, and a kick portion, not illustrated in the drawings, that is connected to the front portion 16A and that is inclined downward toward the rear of the vehicle.

The crash box 18 includes a shock absorbing section 18A serving as a tube shaped section formed in a tube shape, and a plate shaped attachment portion 18B extending along a vehicle vertical direction from a vehicle rear end portion of the shock absorbing section 18A. The crash box 18 is an integrally formed extruded aluminum alloy member. The configuration of the shock absorbing section 18A will be described in detail later. The crash box 18 is fixed by attaching the attachment portion 18B to a flange 16C provided to a vehicle front end portion 16B of the front side member 16 at an attachment portion employing bolts 22 or the like, in a state in which a flange 32 of an inflator 26, described later, is interposed therebetween. Note that the bolts 22 are screwed into weld nuts 24 provided on a vehicle rear face of the flange 16C of the front side member 16.

The bumper reinforcement 20 is disposed with its length direction along the vehicle width direction, and is configured by an extruded aluminum alloy member with a rectangular frame shaped closed cross-section structure as viewed in cross-section from its length direction. Although not illustrated in its entirety, in plan view, a vehicle width direction central portion of the bumper reinforcement 20 is configured curved so as to protrude toward the vehicle front side. The bumper reinforcement 20 is fixed by attaching a vehicle width direction end portion 20A of the bumper reinforcement 20 to a vehicle front end portion 18C of the crash box 18 at an attachment portion employing bolts or the like, or at a joint portion employing welding or the like, not illustrated in the drawings.

A first feature of the present exemplary embodiment is the point that the inflator 26, serving as a gas generator, is disposed inside the front side member 16. Moreover, a second feature is the configuration of the shock absorbing section 18A of the crash box 18. Detailed explanation follows regarding the configuration of the crash box 18 and the inflator 26 configuring relevant portions of the present exemplary embodiment.

The inflator 26 is basically a cylinder type inflator. The inflator 26 is configured including a circular column shaped body portion 28, a gas ejection portion 30, and the flange 32, and is disposed with its length direction along the vehicle front-rear direction. A squib (ignition device), not illustrated in the drawings, is disposed inside the body portion 28, and the inside of the body portion 28 is filled with a gas generating agent that generates a large quantity of gas upon combustion. The flange 32 is configured by a rectangular plate shaped steel member with its plate thickness direction in the vehicle front-rear direction, and is integrally provided to the body portion 28. The flange 32 is in a state clamped between the attachment portion 18B of the crash box 18 and the flange 16C of the front side member 16. The gas ejection portion 30 is disposed at the vehicle front side in an attached state of the inflator 26 to the front side member 16. More specifically, the gas ejection portion 30 is inserted inside the shock absorbing section 18A of the crash box 18 through an insertion hole 34 (see FIG. 1) provided in the attachment portion 18B of the crash box 18, and the majority of the body portion 28 is disposed inside the front portion 16A of the front side member 16. Moreover, the inflator 26 is configured so as to supply gas from the gas ejection portion 30 to the inside of the shock absorbing section 18A of the crash box 18 when a frontal collision of the vehicle 10 has been predicted by a stereo camera 56 serving as a collision prediction section. Note that in the present exemplary embodiment, the inside of the shock absorbing section 18A of the crash box 18 is airtight and is configured such that gas from the inflator 26 does not leak out from inside. In the present exemplary embodiment, a frontal collision of the vehicle 10 can be predicted using the stereo camera 56 and an ECU 58.

The stereo camera 56 is provided in the proximity of a vehicle width direction central portion of a vehicle upper side of a windshield glass, not illustrated in the drawings. The stereo camera 56 is configured capable of detecting a colliding body coming toward the vehicle 10 by imaging ahead of the vehicle 10. The stereo camera 56 measures the distance to the detected colliding body, the relative speed between the vehicle 10 and the colliding body, and the like, and is configured capable of outputting this measurement data to the ECU 58. Note that the collision prediction section may be configured including a millimeter wave radar or the like instead of the stereo camera 56.

The ECU 58 is electrically connected to the inflator 26 and the stereo camera 56 described above, and determines (predicts) whether or not the vehicle 10 and the colliding body are going to collide based on the measurement data sent from the stereo camera 56. When a collision (frontal collision) between the vehicle 10 and the colliding body has been predicted by the ECU 58, the inflator 26 is actuated by an actuation signal from the ECU 58.

Figure 1:
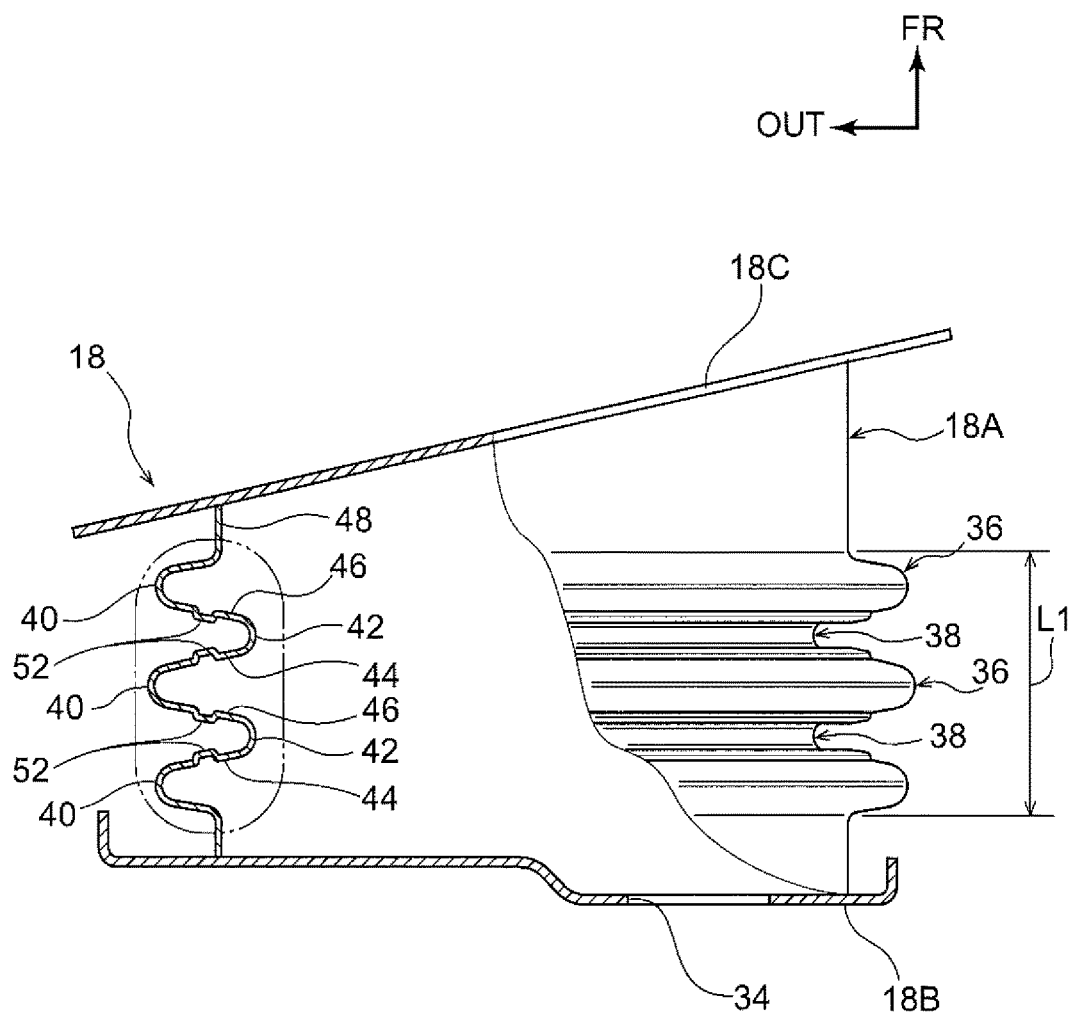
FIG. 1 is a partial cross-section illustrating relevant configuration portions of a crash box configuring a vehicle body transformable front section structure according to a first exemplary embodiment, as viewed from above the vehicle.

As illustrated in FIG. 1, the shock absorbing section 18A of the crash box 18 is disposed with its length direction along the vehicle front-rear direction, is formed in a concertina shape provided with mountain portions and valley portions alternating along the vehicle front-rear direction, and is configured capable of extending in the vehicle front-rear direction.

More specifically, the shock absorbing section 18A is configured including outer fold portions 40 that configure apexes of the respective mountain portions 36 and that are folded into protrusions projecting toward the outside of the shock absorbing section 18A, and inner fold portions 42 that configure apexes of the respective valley portions 38 and that are folded into protrusions projecting toward the inside of the shock absorbing section 18A. Each inner fold portion 42 and the outer fold portion 40 adjacent to the inner fold portion 42 at the vehicle rear side thereof are joined together by a first wall portion 44 with a conical surface shape widening on progression from the vehicle front toward the vehicle rear. Each outer fold portion 40 and the inner fold portion 42 adjacent to the outer fold portion 40 at the vehicle rear side thereof are joined together by a second wall portion 46 with a conical surface shape narrowing on progression from the vehicle front toward the vehicle rear. In the shock absorbing section 18A, an outer fold portion 40, an inner fold portion 42, a first wall portion 44, and a second wall portion 46 provided connected to each other make a set, and plural of these sets are arrayed along the vehicle front-rear direction. Namely, the first wall portion 44 is in a state connected to the second wall portion 46 adjacent in the vehicle front-rear direction through the mountain portion 36 on one vehicle front-rear direction side, and is disposed facing the second wall portion 46 adjacent on the other vehicle front-rear direction side along the vehicle front-rear direction across the valley portion 38.

Figure 2:
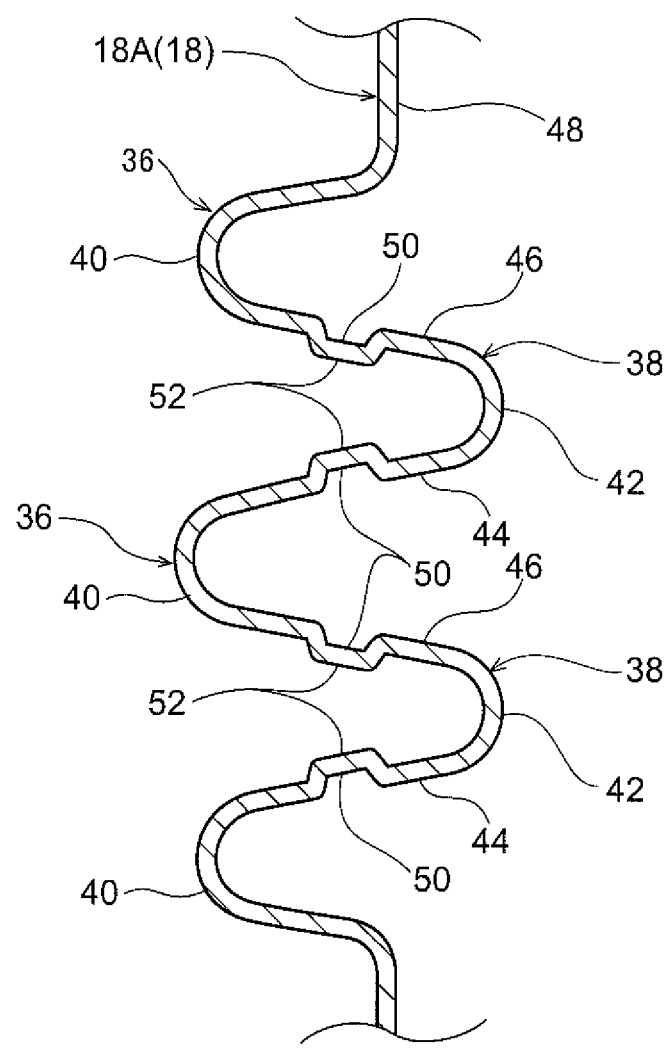
FIG. 2 is an enlarged cross-section illustrating configuration of a crash box configuring a vehicle body transformable front section structure according to the first exemplary embodiment (enlargement of the portion encircled by double-dashed line in FIG. 1)

As illustrated in FIG. 2, a recess 50 is formed at an inner face 48 side of the shock absorbing section 18A in each first wall portion 44 and each second wall portion 46 to enlarge the surface area of the inner face 48. The recesses 50 configure part of bead portions 52 formed as protrusions projecting toward the outside of the shock absorbing section 18A on the first wall portions 44 and the second wall portions 46 respectively. More specifically, the bead portions 52 are formed in trapezoidal shapes that widen on progression from an outer face side toward the inner face of the shock absorbing section 18A side as viewed in cross-section from a direction orthogonal to an extension direction of the mountain portions 36 and the valley portions 38 (a radial direction of the shock absorbing section 18A). Moreover, the bead portions 52 are formed in circular annular shapes as viewed along the extension direction of the shock absorbing section 18A (vehicle front-rear direction). The recesses 50 configure faces of the bead portions 52 that face the inside of the shock absorbing section 18A.

Operation and Advantageous Effects of the Present Exemplary Embodiment

Explanation follows regarding operation and advantageous effects of the present exemplary embodiment.

Figure 4:
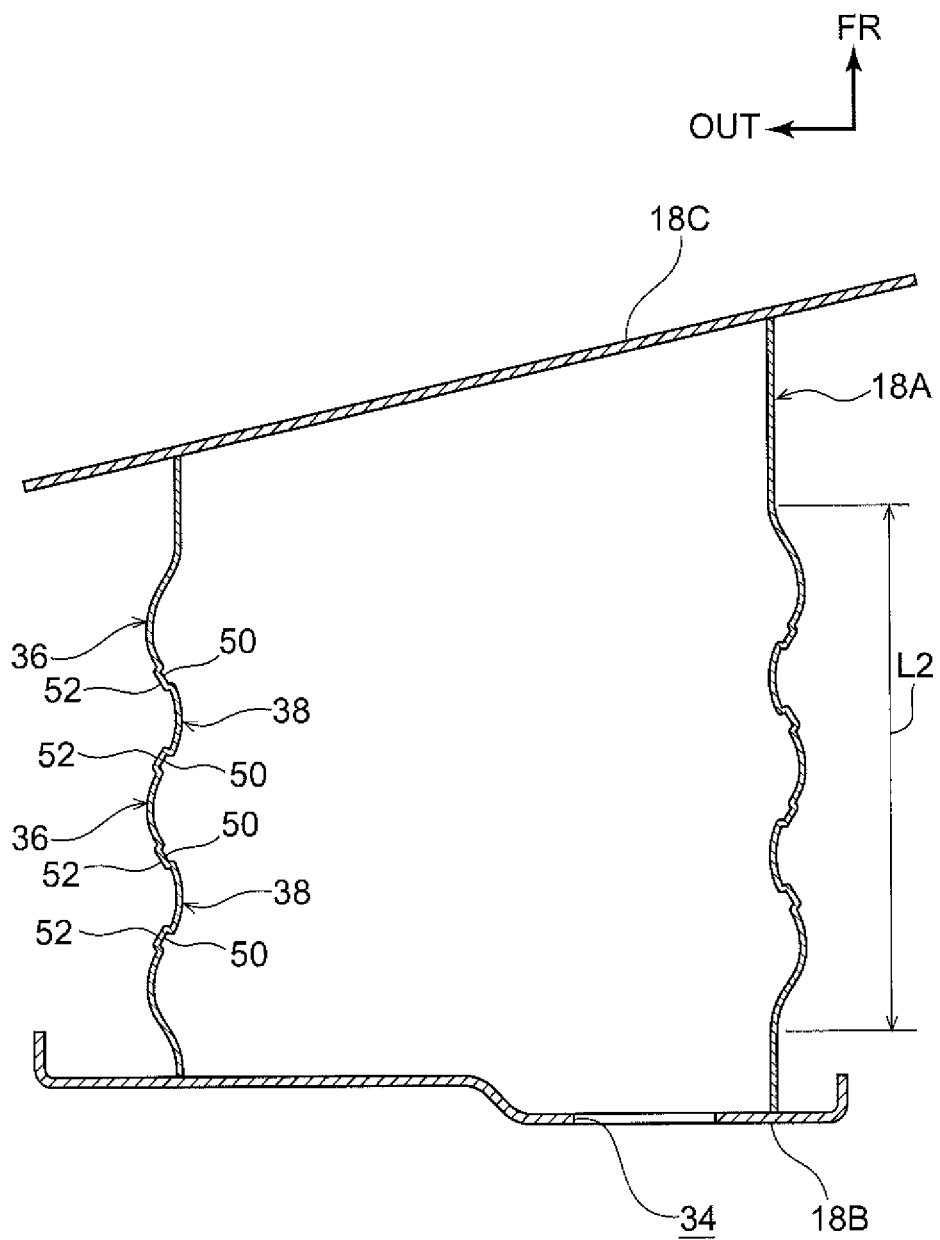
FIG. 4 is a cross-section illustrating a crash box configuring a vehicle body transformable front section structure according to the first exemplary embodiment in a state in which a gas generator has been actuated, as viewed from above the vehicle.

In the present exemplary embodiment, when a frontal collision of the vehicle 10 has been predicted by the collision prediction section, the inflator 26 disposed inside the shock absorbing section 18A configuring the crash box 18 actuates, thereby supplying gas inside the shock absorbing section 18A. Moreover, the shock absorbing section 18A of the crash box 18 is disposed with its length direction along the vehicle front-rear direction, is provided alternately with the mountain portions 36 and the valley portions 38 along the vehicle front-rear direction, and is configured capable of extending in the vehicle front-rear direction. Thus, as illustrated in FIG. 4, prior to a collision of the vehicle 10 with a colliding body, gas is supplied inside the shock absorbing section 18A and the shock absorbing section 18A extends in the vehicle front-rear direction, enabling the crushing stroke capable of absorbing collision load from the vehicle front side to be lengthened compared to a state before the gas was supplied.

More specifically, the length of the portion of the shock absorbing section 18A of the crash box 18 provided with the mountain portions 36 and the valley portions 38 extends from a length L1 prior to actuation of the inflator 26 (see FIG. 1), to a length L2 after actuation of the inflator 26. In other words, the crash box 18 functions as a crash box with a crushing stroke lengthened from its original state by L2-L1. As a result, when collision load from the vehicle front side is large, the crush amount of the shock absorbing section 18A of the crash box 18 is large, and when the collision load is small, the crush amount is small. Namely, in the present disclosure, collision load from the vehicle front side can be absorbed accommodating collision loads of different magnitudes, according to the size of the crush amount of the shock absorbing section 18A of the crash box 18.

Note that if collision load from the vehicle front side were to be input in a state in which the gas from the inflator 26 has not extended the shock absorbing section 18A to a sufficiently complete state, it is conceivable that the shock absorbing section 18A could fold and deform along the alternately provided mountain portions 36 and valley portions 38.

However, in the present exemplary embodiment, the shock absorbing section 18A of the crash box 18 is configured including the first wall portions 44 and the second wall portions 46 respectively disposed connected to each other in the vehicle front-rear direction through the mountain portions 36. The first wall portions 44 and the second wall portions 46 are formed with the recesses 50 on the inner face 48 side of the shock absorbing section 18A so as to enlarge the surface area of the inner face 48. Thus, the surface area of the first wall portions 44 and the second wall portions 46 bearing pressure from the gas generated by the inflator 26 is increased compared to cases in which the recesses 50 are not provided, and a moment M to spread apart the first wall portions 44 and the second wall portions 46 about the mountain portions 36 is generated. As a result, crease lines can be suppressed from remaining in a state in which the shock absorbing section 18A of the crash box 18 has extended, enabling the shock absorbing section 18A to stably absorb collision load along its length direction. Accordingly, in the present exemplary embodiment, collision load from the vehicle front side can be stably absorbed even in a configuration in which the crash box 18 is capable of extending in the vehicle front-rear direction.

In the present exemplary embodiment, the recesses 50 configure part of the bead portions 52 that form protrusions projecting toward the outside of the shock absorbing section 18A on the first wall portions 44 and the second wall portions 46 respectively. Thus, the recesses 50 can be formed in the first wall portions 44 and the second wall portions 46 while securing the plate thickness of the first wall portions 44 and the second wall portions 46.

If configuration were to be made in which the plate thickness of the first wall portion 44 and the second wall portion 46 was locally thinned to provide the recesses 50, it is conceivable that stress would concentrate around the periphery of the recesses 50 during crushing of the shock absorbing section 18A.

To address this point, in the present exemplary embodiment, the plate thickness around the periphery of the recesses 50 is secured as described above, such that stress can be suppressed from concentrating locally, and more specifically, suppressed from concentrating around the periphery of the recesses 50, during crushing of the crash box 18.

Modified Example of First Exemplary Embodiment

Figure 5:
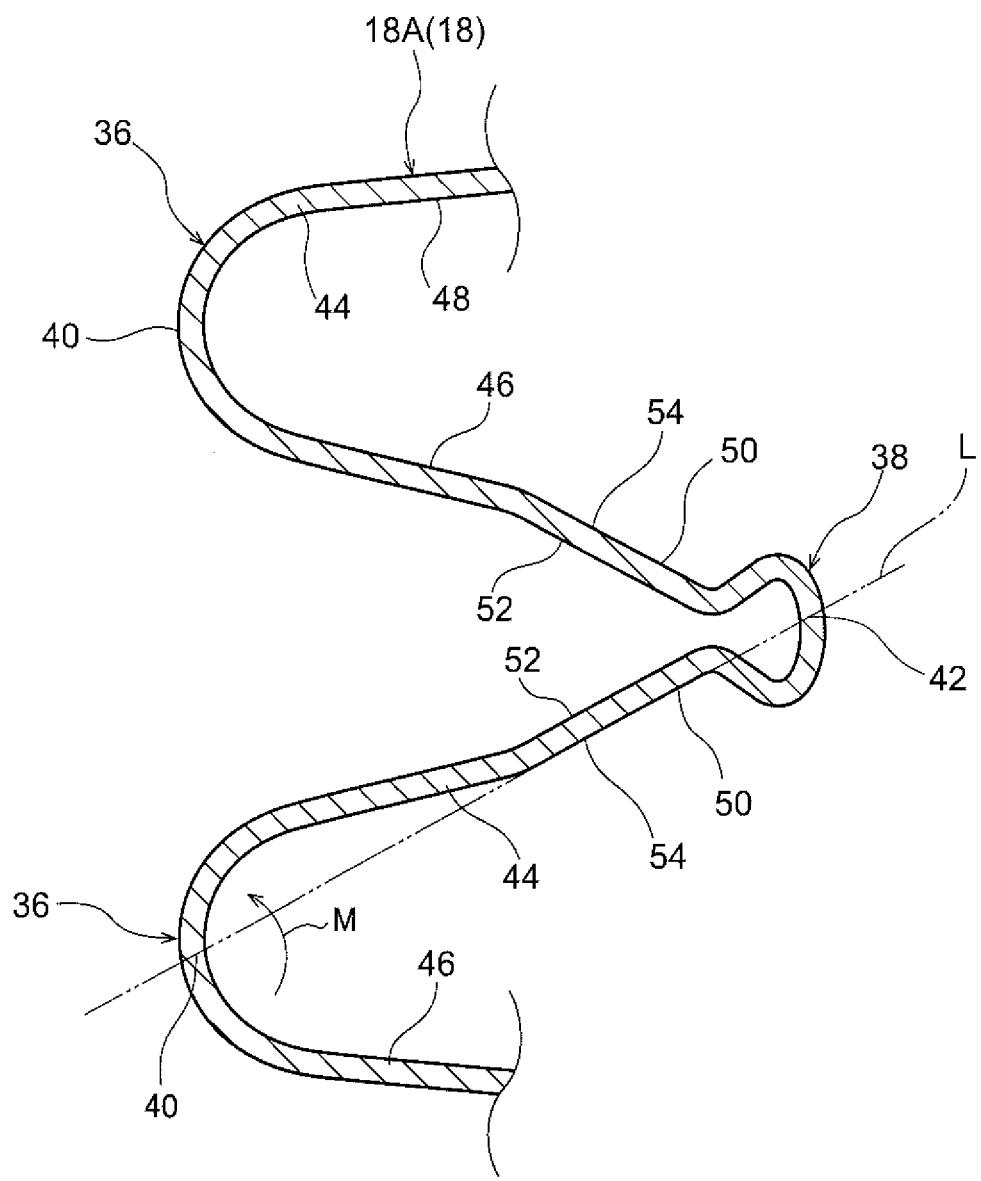
FIG. 5 is a cross-section illustrating relevant portions of a crash box configuring a vehicle body transformable front section structure according to a modified example of the first exemplary embodiment, as viewed from above the vehicle.

Next, explanation follows regarding a modified example of the first exemplary embodiment, with reference to FIG. 5.

In the modified example, each bead portion 52 is formed in a substantially V-shape that is open toward the inner face 48 side of the shock absorbing section 18A and that has a longer edge toward the mountain portion 36 side, as viewed in cross-section from a direction orthogonal to the extension direction of the mountain portions 36 and the valley portions 38. The recesses 50 configuring part of the bead portions 52 are each configured including a parallel plane portion 54 that is formed parallel to a straight line L joining the apex of the respective mountain portion 36 and the apex of the respective valley portion 38, as viewed in cross-section from a direction orthogonal to the extension direction of the mountain portions 36 and the valley portions 38.

More specifically, the parallel plane portion 54 configures a portion on the outer fold portion 40 side of the recess 50, and a peripheral edge portion on the outer fold portion 40 side of the parallel plane portion 54 is positioned at an intermediate position between the mountain portion 36 and the valley portion 38 (at an intermediate position between the outer fold portion 40 and the inner fold portion 42). Namely, as viewed in cross-section from a direction orthogonal to the extension direction of the mountain portion 36 and the valley portion 38, a portion of the recess 50 where the recess amount in the inner face 48 of the shock absorbing section 18A is greatest is positioned further to the valley portion 38 side than the intermediate position between the mountain portion 36 and the valley portion 38.

In such a configuration, the recess 50 is disposed in a position where the distance between the recess 50 and the mountain portion 36 is the distance between the recess 50 and the valley portion 38, or greater. Thus, the moment arm of the moment acting due to pressure from the gas generated by the inflator 26 so as to spread apart the first wall portion 44 and the second wall portion 46 can be lengthened. As a result, pressure due to the gas generated by the inflator 26 can be efficiently employed in extending the crash box 18.

Out of the pressure due to the gas generated by the inflator 26, the proportion of the pressure acting orthogonal to the straight line L joining the apex of the mountain portion 36 and the apex of the valley portion 38 can be increased. Moreover, the proportion of the gas pressure acting in a direction orthogonal to the moment arm of the moment M to spread apart the first wall portion 44 and the second wall portion 46 about the mountain portions 36 can be increased. As a result, a force to extend the crash box 18 that occurs due to the gas generated by the inflator 26 can be increased.

Second Exemplary Embodiment

Figure 6:
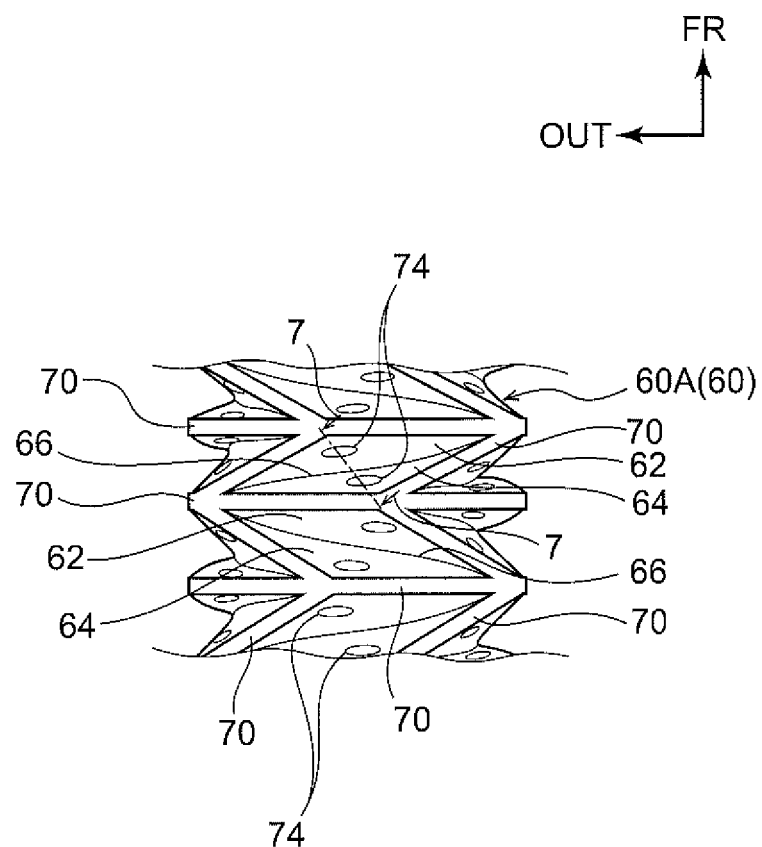
FIG. 6 is a plan view illustrating relevant portions of a crash box configuring a vehicle body transformable front section structure according to a second exemplary embodiment, as viewed from above the vehicle.
Figure 7:
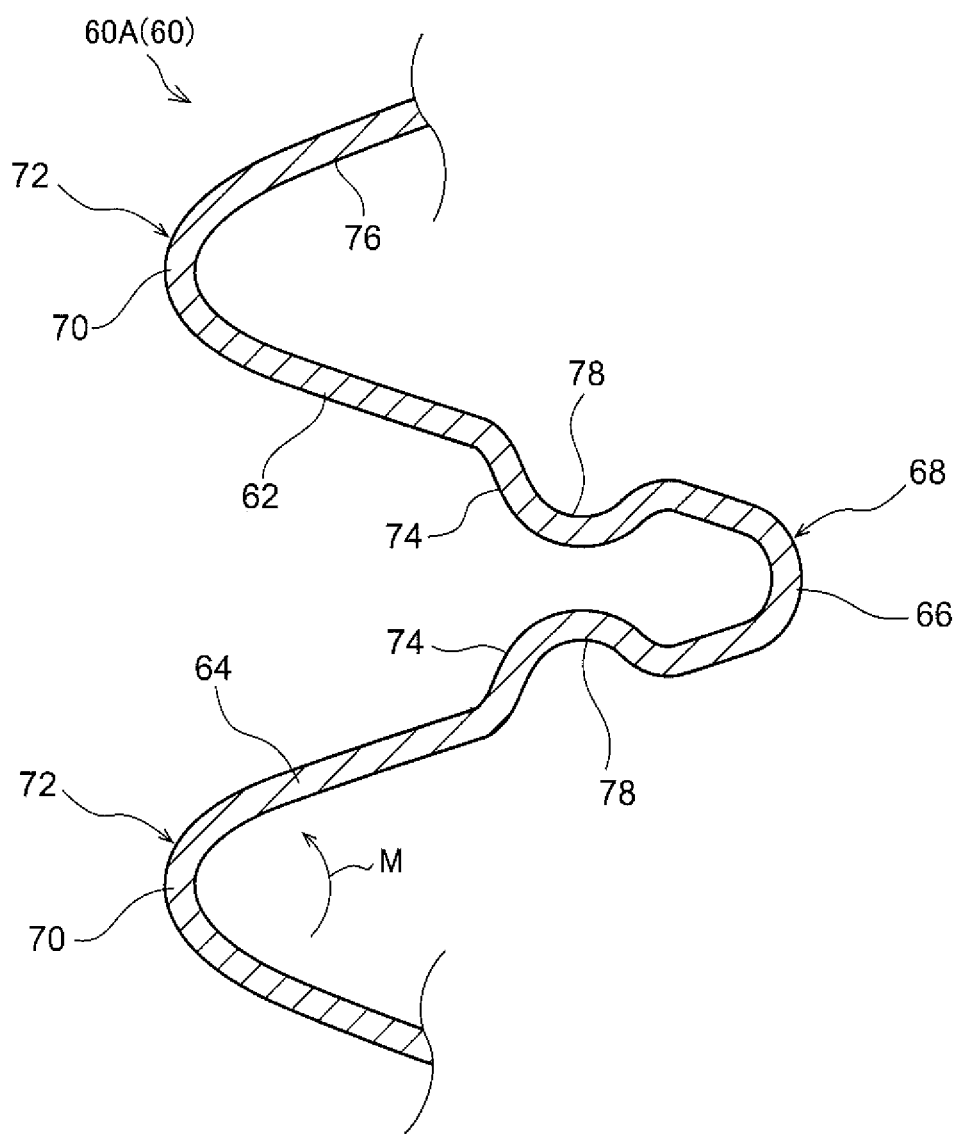
FIG. 7 is an enlarged cross-section illustrating configuration of relevant portions of a crash box configuring a vehicle body transformable front section structure according to the second exemplary embodiment (enlarged cross-section illustrating a state sectioned along line 7-7 in FIG. 6)
Figure 8:
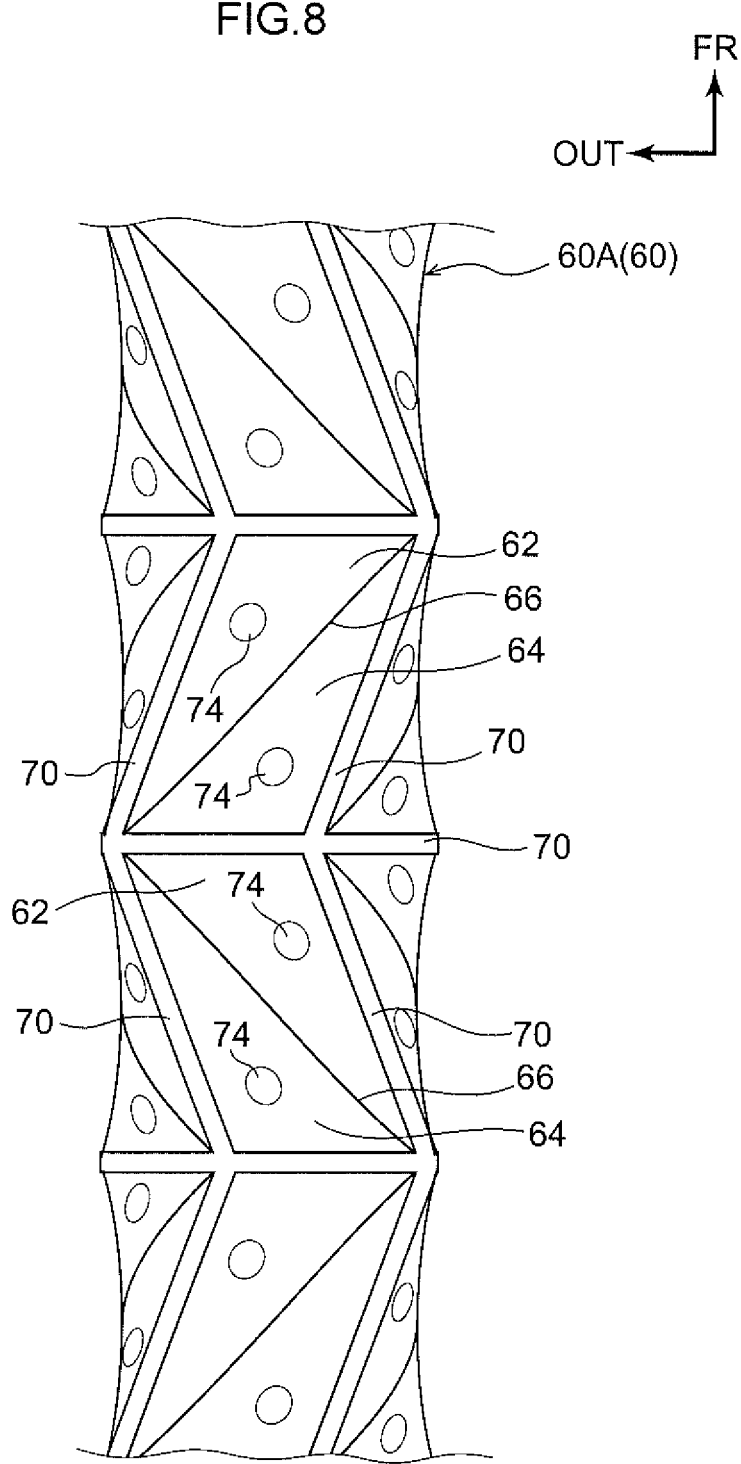
FIG. 8 is a plan view illustrating relevant portions of a crash box configuring a vehicle body transformable front section structure according to the second exemplary embodiment in a state in which a gas generator has been actuated, as viewed from above the vehicle.

Next, explanation follows regarding a vehicle body transformable front section structure according to a second exemplary embodiment of the present disclosure, with reference to FIG. 6 to FIG. 8. Note that configuration portions similar to those of the first exemplary embodiment described above are appended with the same reference numerals, and explanation thereof is omitted.

In the present exemplary embodiment, a crash box 60 has the same basic configuration as the crash box 18 described above; however, first wall portions 62 and second wall portions 64 configuring a shock absorbing section 60A serving as a tube shaped section are configured by isosceles triangle shapes. More specifically, one first wall portion 62 and one second wall portion 64 make a set, and base edges of the two wall portions configuring each set are contiguous to each other and respectively disposed on either side of an inner fold portion 66 that is folded into a protrusion projecting toward the inside of the shock absorbing section 60A. Equal edges disposed at the vehicle front and rear of the set of the first wall portion 62 and the second wall portion 64 are disposed so as to overlap with straight lines extending in the vehicle width direction as viewed along the vehicle vertical direction. Namely, in the present exemplary embodiment, the first wall portion 62 and the second wall portion 64 are respectively disposed facing each other in the vehicle front-rear direction on either side of a valley portion 68, and face each other at an angle with a specific angle of inclination with respect to the vehicle front-rear direction.

The sets of the first wall portions 62 and the second wall portions 64 are arrayed around a peripheral direction and along the length direction of the shock absorbing section 60A, and are contiguous to each other about outer fold portions 70 that are folded into protrusions projecting toward the outside of the shock absorbing section 60A. Note that the sets of the first wall portion 62 and the second wall portion 64 arrayed around the peripheral direction of the shock absorbing section 60A are configured similarly to each other. However, the sets of the first wall portion 62 and the second wall portion 64 arrayed along the length direction of the shock absorbing section 60A are configured with symmetry to each other about the outer fold portions 70 running along the peripheral direction of the shock absorbing section 60A. Namely, in the present exemplary embodiment, although mountain portions 72 and valley portions 68 are provided alternately to the shock absorbing section 60A along the vehicle front-rear direction, the valley portions 68 are formed in zigzag shapes extending along the vehicle front-rear direction.

Moreover, semispherical shaped bead portions 74 forming protrusions projecting toward the outside of the shock absorbing section 60A are formed about inner centers of the respective first wall portions 62 and the second wall portions 64, namely, centered on inscribed circles within the triangle shapes configured by the respective inner fold portions 66 and the outer fold portions 70. A face of each bead portion 74 facing the inside of the shock absorbing section 60A configures a recess 78 that enlarges the surface area of an inner face 76 of the shock absorbing section 60A.

In such a configuration, when the inside of the shock absorbing section 60A is supplied with gas, the shock absorbing section 60A extends along the vehicle front-rear direction while rotating relative to the peripheral direction of the shock absorbing section 60A on one and the other vehicle front-rear direction sides of boundaries configured by the outer fold portions 70 running along the peripheral direction. When this occurs, pressure due to the gas generated by the inflator 26 acts on the recesses 78 formed in the first wall portions 62 and the second wall portions 64, and a force acts in a direction to spread apart the first wall portion 62 and the second wall portion 64 about the mountain portions 72. Thus, the present exemplary embodiment also exhibits similar operation and advantageous effects to those of the first exemplary embodiment described above. By configuring the shock absorbing section 60A as described above, the extension amount of the shock absorbing section 60A is increased, and thus, the crushing stroke capable of absorbing collision load from the vehicle front side can be lengthened further.

Supplementary Explanation of Above Exemplary Embodiments (1) In the exemplary embodiments described above, the recesses are provided to both the first wall portions and the second wall portions; however, configuration may be made in which the recesses are provided to either the first wall portions or the second wall portions.

(2) In the exemplary embodiments described above, the recesses are provided as part of the bead portions; however, depending on the shape of the crash box, configuration may be made in which recesses, or grooves corresponding to the recesses, are provided without providing the bead portions.

(3) In the exemplary embodiments described above, configuration is made in which the majority of the inflator 26 is disposed inside the front side member 16, and the gas ejection portion 30 is inserted inside the crash box 18. However, there is no limitation thereto. More specifically, configuration may be made in which the entire inflator 26 is disposed inside the front side member 16, and a gas guide pipe is used to guide the gas inside the crash box 18. Configuration may also be made in which the entire inflator 26 is disposed inside the shock absorbing section 18A of the crash box 18.

What is claimed is:

1. A vehicle body transformable front section structure comprising:
    a front side member that is disposed with a length direction in a vehicle front-rear direction;
    a crash box that is disposed with a length direction in the vehicle front-rear direction, that is configured including a tube shaped section having mountain portions and valley portions provided alternately along the vehicle front-rear direction and capable of extending in the vehicle front-rear direction, and that is attached to an end portion at a vehicle front side of the front side member;
    bumper reinforcement that extends in a vehicle width direction, that is disposed at a vehicle front side of the crash box, and that is attached to the crash box;
    a collision prediction section that is capable of predicting a vehicle frontal collision; and
    a gas generator that is disposed inside the tube shaped section or the front side member, and that generates gas and supplies gas to inside the tube shaped section on actuation when the frontal collision has been predicted by the collision prediction section;
    the tube shaped section being configured including a first wall portion and a second wall portion respectively disposed connected to each other in the vehicle front-rear direction through each of the mountain portions; and
    a recess being formed on an inner face side of the tube shaped portion in at least one of the first wall portion or the second wall portion so as to enlarge the surface area of the inner face side.

2. The vehicle body transformable front section structure of claim 1, wherein the recess is disposed at a position where a distance between the recess and a respective said mountain portion is the distance between the recess and a respective said valley portion, or greater.

3. The vehicle body transformable front section structure of claim 2, wherein the recess is configured including a parallel plane portion that is formed parallel to a straight line joining an apex of the respective mountain portion and an apex of the respective valley portion together in cross-section viewed from a direction orthogonal to an extension direction of the mountain portion and the valley portion.

4. The vehicle body transformable front section structure of claim 1, wherein the recess configures part of bead portions that form protrusions projecting toward the outside of the tube shaped section on the first wall portion and the second wall portion respectively.

5. The vehicle body transformable front section structure of claim 1, wherein the first wall portion and the second wall portion are configured by isosceles triangle shapes.

6. The vehicle body transformable front section structure of claim 5, wherein the first wall portion and the second wall portion make a set, and base edges of the two wall portions configuring the set are contiguous to each other.

7. The vehicle body transformable front section structure of claim 5, wherein equal edges disposed at the vehicle front and rear of the set of the first wall portion and the second wall portion are disposed so as to overlap with straight lines extending in the vehicle width direction as viewed along a vehicle vertical direction.

* * * * *